US012587981B2

(12) United States Patent
Zhang

(10) Patent No.: US 12,587,981 B2
(45) Date of Patent: Mar. 24, 2026

(54) NETWORK ACCESS DEVICE AND SYSTEM

(71) Applicants:PROSE TECHNOLOGIES (SUZHOU) CO., LTD., Suzhou (CN); PROSE TECHNOLOGIES LLC, Mount Olive, NJ (US)

(72) Inventor: Deping Zhang, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 317 days.

(21) Appl. No.: 18/349,575

(22) Filed: Jul. 10, 2023

(65) Prior Publication Data

US 2023/0362849 A1    Nov. 9, 2023

Related U.S. Application Data

(63) Continuation of application No. PCT/CN2022/076747, filed on Feb. 18, 2022.

(30) Foreign Application Priority Data

Oct. 21, 2021    (CN) .......................... 202122538713.1

(51) Int. Cl.
*H04W 56/00*    (2009.01)
*H04L 5/14*    (2006.01)
(52) U.S. Cl.
CPC ......... *H04W 56/001* (2013.01); *H04L 5/1469* (2013.01)
(58) Field of Classification Search
CPC ........................... H04W 56/001; H04L 5/1469
See application file for complete search history.

(56) References Cited

FOREIGN PATENT DOCUMENTS

CN    102882573 A    1/2013
CN    206196066 U    5/2017
(Continued)

OTHER PUBLICATIONS

World Intellectual Property Organization (WIPO) International Search Report for PCT/CN2022/076747 Jun. 23, 2022 6 pages (with translation).

*Primary Examiner* — Ayman A Abaza
*Assistant Examiner* — Benjamin T. Ranew
(74) *Attorney, Agent, or Firm* — ANOVA LAW GROUP, PLLC

(57)    ABSTRACT

A network access device includes: a first signal transceiver port, configured to transmit and receive a first radio frequency signal in a multiple-input-multiple-output manner; a second signal transceiver port, configured to transmit and receive a second radio frequency signal in a single-input-single-output manner; a signal processing unit, configured to filter and to combine and/or split the first radio frequency signal and the second radio frequency signal, the signal processing unit being respectively connected to the first signal transceiver port and the second signal transceiver port; a synchronization unit, configured to demodulate, analyze and modulate the first radio frequency signal and a TDD (Time Division Duplex) switch signal in the second radio frequency signal, the synchronization unit being respectively connected to the first signal transceiver port, the second signal transceiver port, and the signal processing unit.

12 Claims, 7 Drawing Sheets

(56) References Cited

FOREIGN PATENT DOCUMENTS

| CN | 113438733 | A | 9/2021 | | |
|----|-----------|-----|--------|--------|-------------|
| WO | WO-2013016905 | A1 * | 2/2013 | .......... | H04W 88/085 |
| WO | 2016057304 | A1 | 4/2016 | | |

* cited by examiner

NETWORK ACCESS DEVICE AND SYSTEM

RELATED APPLICATIONS

This application is a continuation application of PCT Patent Application No. PCT/CN2022/076747, filed on Feb. 18, 2022, which claims priority to Chinese Patent Application No. 202122538713.1 filed with the National Intellectual Property Administration, People's Republic of China on Oct. 21, 2021, all of which are incorporated herein by reference in entirety.

FIELD OF THE TECHNOLOGY

The present disclosure relates to a field of mobile communication, in particular to a network access device and system.

BACKGROUND

With the development of the Internet, users' demand for data services is increasing by day, and the survey shows that more data services occur in indoor scenarios. Multiple-Input-Multiple-Output (MIMO) technology is one of the important ways for Long Term Evolution (LTE) to improve system capacity. But at present, whether it is 2G communication, 3G communication, or 4G communication, relevant indoor distributed antenna system (DAS) is only a single wiring design, that is, Single-Input-Single-Output (SISO), which may not support multiple-input-multiple-output.

However, with the rise of 5G communications, the 5G communications have gradually gained an increasing market share, and the network penetration rate is also increasing. In the process of network optimization for 5G networks, it is desirable to realize the MIMO technology of 5G communication, that is, at least two indoor signal coverages may be achieved in the DAS.

If the traditional design method is followed, or the existing DAS that only supports SISO is abandoned, and a new line is arranged, high reconstruction cost is a problem. At the same time, it is easy to affect the existing properties, and the transformation is difficult. Moreover, in the existing DAS system, the demodulation of the Time Division Duplex (TDD) switching signal is placed in the remote module, and the cost is relatively high.

SUMMARY

Provided are a network access device and system, capable of realizing a MIMO network access mode at a near-end of a DAS system, and processing TDD switch signals.

In a first aspect, the present disclosure provides a network access device. The device includes: a first signal transceiver port, configured to transmit and receive a first radio frequency signal in a multiple-input-multiple-output manner; a second signal transceiver port, configured to transmit and receive a second radio frequency signal in a single-input-single-output manner; a signal processing unit, configured to filter the first radio frequency signal and the second radio frequency signal, and to combine and/or split the first radio frequency signal and the second radio frequency signal, the signal processing unit being respectively connected to the first signal transceiver port and the second signal transceiver port; a synchronization unit, configured to demodulate, analyze and modulate the first radio frequency signal and a TDD (Time Division Duplex) switch signal in the second radio frequency signal, the synchronization unit being respectively connected to the first signal transceiver port, the second signal transceiver port, and the signal processing unit.

In certain embodiment(s), the signal processing unit includes: a first filter circuit connected to the first signal transceiver port; a second filter circuit connected to the second signal transceiver port; an uplink signal processing circuit respectively connected to the first filter circuit and the second filter circuit; and a downlink signal processing circuit respectively connected to the first filter circuit and the second filter circuit.

In certain embodiment(s), the downlink signal processing circuit includes: a first downlink combiner, connected to the second filter circuit, the first downlink combiner being configured to combine downlink radio frequency signals output by the second filter circuit to generate a downlink combined signal and to output the downlink combined signal to a second downlink combiner; the second downlink combiner, respectively connected to the first downlink combiner and a PLL (Phase Locked Loop) element, the second downlink combiner being configured to split the downlink combined signal and the TDD switch signal of the synchronization unit input through the PLL element to generate a downlink split signal, and output the downlink split signal to a third downlink combiner; and the third downlink combiner, respectively connected to the second downlink combiner and the first filter circuit, the third downlink combiner being configured to combine the downlink radio frequency signal output by the first filter circuit and the downlink split signal output by the second downlink splitter so as to generate a downlink output signal.

In certain embodiment(s), the uplink signal processing circuit includes: a first uplink power splitter, connected to the second filter circuit, the first uplink power splitter being configured to split the uplink combined signal output by the first uplink combiner to generate a second uplink split signal and to output the second uplink split signal to the second filter circuit; a first uplink combiner, connected to the first uplink power splitter, the first uplink combiner being configured to combine the first uplink split signal output by the second uplink combiner to generate an uplink combined signal and to output the uplink combined signal to the first uplink power splitter; and a second uplink combiner, respectively connected to the first uplink combiner and the first filter circuit, and the second uplink combiner being configured to split an uplink radio frequency signal of the first radio frequency signal and an uplink radio frequency signal of the second radio frequency signal to generate a first uplink split signal, and to output the first uplink split signal to the first filter circuit and the first uplink combiner.

In certain embodiment(s), the first filter circuit is a filter, and the second filter circuit is a filter or a duplexer.

In certain embodiment(s), the first signal transceiver port comprises a 5G network port, and the second signal transceiver port comprises a 4G network port.

In certain embodiment(s), the second signal transceiver port further comprises at least one of a 2G network port and a 3G network port.

In certain embodiment(s), the synchronization unit includes: a modulation and demodulation circuit for demodulating the TDD switch signal to output a pulse signal, and for generating a modulated TDD switch signal; and a signal analysis circuit, connected to the modulation and demodulation circuit, for analyzing the pulse signal output by the modulation and demodulation circuit.

In certain embodiment(s), the modulation and demodulation circuit includes: a first modem, connected to the first signal transceiver port, for modulating and demodulating the TDD switch signal in the first radio frequency signal; a second modem, connected to the second signal transceiver port, for modulating and demodulating the TDD switch signal in the second radio frequency signal.

In certain embodiment(s), the modulated TDD switch signal is output through the signal processing unit.

In certain embodiment(s), the signal analysis circuit includes: an MCU (Micro-Controller Unit) circuit, configured to analyze and control the pulse signal; and a CPLD (Complex Programmable Logic Device) circuit, configured to analyze and calculate the pulse signal.

In a second aspect, the present disclosure provides a network access system. The system includes any network access device according to the first aspect of the present disclosure.

The beneficial effects of the present disclosure include: the support for MIMO radio frequency signals is realized by including the first signal transceiver port of multiple-input-multiple-output in the network access device; by including a single-input-single-output second signal transceiver port in the network access device, the support for the radio frequency signal of SISO in the existing DAS system is realized; Flexible networking may be realized by including the above two different sending and receiving ports in the network access device. On the other hand, by including a synchronization unit in the network access device, it becomes possible to demodulate and analyze the TDD switch signal in the radio frequency signal, and the modulated and analyzed TDD switch signal is sent to a far-end of the DAS system through the signal processing circuit, so as to realize processing of the TDD switch signal at the near-end of the DAS system. Further, the present disclosure reduces the cost of the far-end module in the DAS system.

It should be understood that what is described in this section is not intended to identify key or important features of the embodiment(s) of the present disclosure, nor is it intended to limit the scope of the present disclosure. Certain features of the present disclosure will become easily understood through the following description.

BRIEF DESCRIPTION OF THE DRAWINGS

The above and other features, advantages and aspects of various embodiment(s) of the present disclosure will become more apparent with reference to the following detailed description, when taken in conjunction with the accompanying drawings. In the drawings, the same or similar reference numerals indicate the same or similar elements.

DETAILED DESCRIPTION

Figure 1:
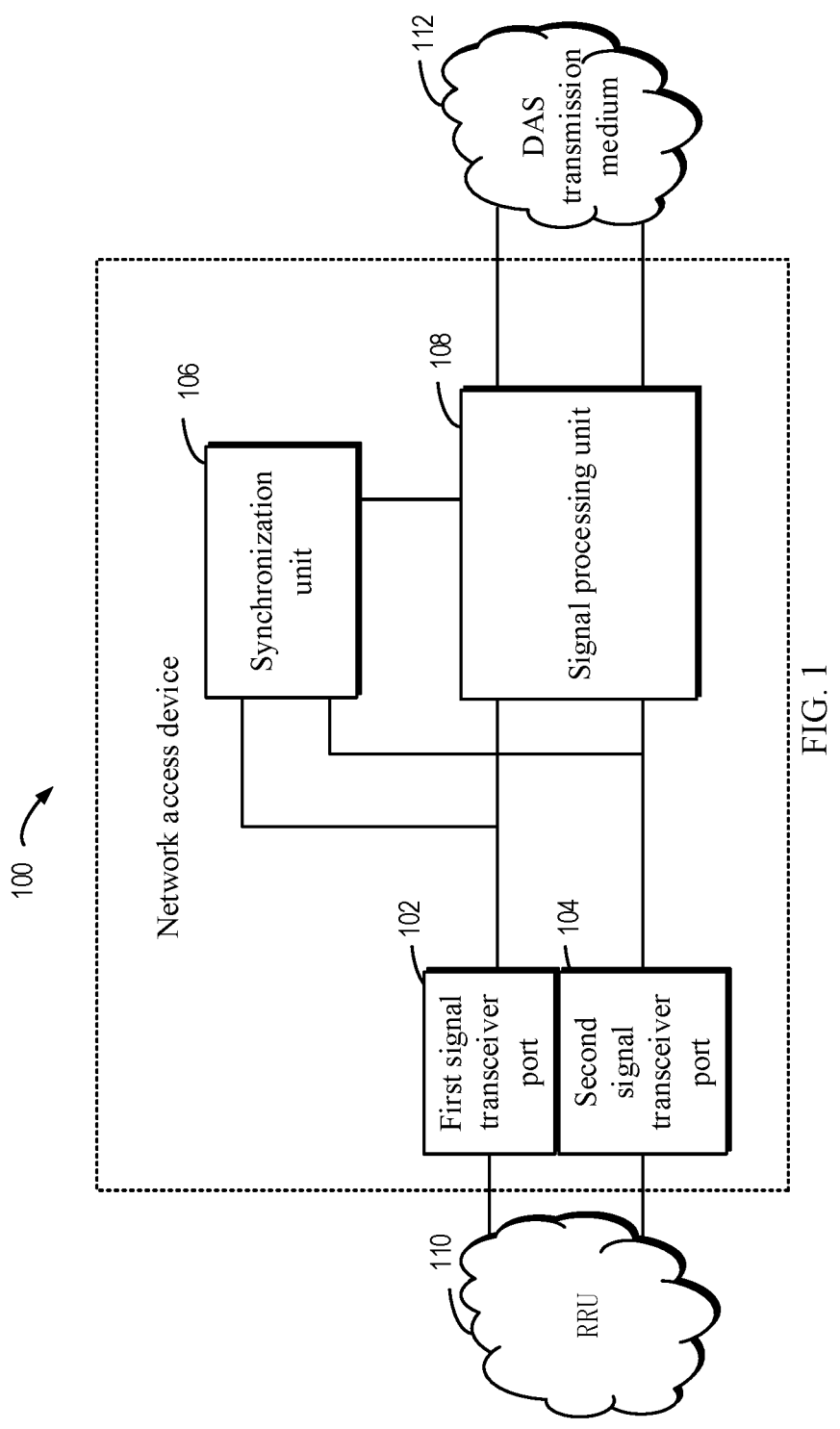
FIG. 1 shows a schematic diagram of a network access device architecture 100 according to certain embodiment(s) of the present disclosure.

Certain embodiment(s) of the present disclosure are described below in conjunction with the accompanying drawings, which include various details of the embodiment (s) of the present disclosure to facilitate understanding, and they should be regarded as exemplary only. Accordingly, those of ordinary skill in the art will recognize that various changes and modifications of the embodiment(s) described herein may be made without having to depart from the scope and spirit of the present disclosure. Moreover, descriptions of well-known functions and constructions may be omitted in the following description for clarity and conciseness.

The term "comprising" and its variants used in the present disclosure represent an open inclusion, for example, "including but not limited to". The term "or" means "and/or" unless otherwise stated. The term "based on" means "based at least in part on". The terms "one embodiment" and "certain embodiment(s)" mean "at least one example embodiment." The term "another embodiment" means "at least one further embodiment". The terms "first", "second", and so on may refer to different or the same object.

As described above, whether it is 2G communication, 3G communication, or 4G communication, relevant indoor coverage system (DAS) is only a single-way wiring design, which may not provide network coverage for multiple standard network systems. But with the rise of 5G communication, it is desirable to realize the MIMO technology of 5G communication, that is, at least two indoor signal coverage may be achieved in DAS. If the traditional design method is followed, or the existing DAS that only supports SISO is abandoned, and a new line is arranged, there will be problems of high renovation costs, and it will easily affect the existing properties, making the renovation difficult. At the same time, the existing DAS system puts the TDD switch signal demodulation at the remote end, and the cost is relatively high.

In order to at least partly solve one or more of the above problems and other potential problems, embodiment(s) of the present disclosure provide a network access device. In this solution, the network access device includes multiple transceiver ports with different input and output modes. Among them, the first transceiver port transmits and receives radio frequency signals in a multiple-input-multiple-output manner (MIMO), realizing the support of MIMO radio frequency signals, and the second transceiver port transmits and receives radio frequency signals in a single-input-single-output manner (SISO), realizing the support of SISO radio frequency signals. By including the above two different transceiver ports in the network access device, flexible networking in different ways may be realized in the same DAS. On the other hand, the network access device also includes a synchronization unit, which may demodulate and analyze the TDD switching signal in the radio frequency signal, and modulate the analyzed TDD switching signal, so that the modulated TDD switching signal is sent to the far-end of the DAS system through the signal processing circuit of the network access device. Through the above technical solution, the network access device realizes support for MIMO radio frequency signals in the DAS system and flexible networking with existing SISO radio frequency signals, and realizes processing of TDD switch signals in the near-end of the DAS system. In addition, the present disclosure also saves the cost of far-end modules in the DAS system.

Hereinafter, examples of this solution will be described in more detail with reference to the accompanying drawings. For ease of understanding, data mentioned in the following description are exemplary, and are not intended to limit the protection scope of the present disclosure.

FIG. 1 shows a schematic diagram of a network access device architecture 100 according to certain embodiment(s) of the present disclosure. As shown in FIG. 1, the device includes a first signal transceiver port 102, a second signal transceiver port 104, a signal processing unit 108, and a synchronization unit 106. The first signal transceiver port 102 and the second signal transceiver port 104 are connected to the RRU (Remote Radio Unit) 110. The signal processing unit 108 is connected to the first signal transceiver port 102, the second signal transceiver port 104 and the DAS (Distributed Antenna System) transmission medium 112. The synchronization unit 106 is connected to the first signal transceiver port 102, the second signal transceiver port 104, and the signal processing unit 108.

The present disclosure may realize MIMO network access mode, and at the same time demodulate, analyze and modulate the TDD switch signal at a near-end of the DAS system, and transmit the TDD switch signal to a far-end of the DAS system.

The first signal transceiver port 102 is used for transmitting and receiving a first radio frequency signal in a multiple-input-multiple-output manner, and the second signal transceiver port 104 is used for transmitting and receiving a second radio frequency signal in a single-input-single-output manner.

The signal processing unit 108 is used for filtering, and combining and/or splitting the first radio frequency signal and the second radio frequency signal, and the signal processing unit 108 is connected to the first signal transceiver port 102 and the second signal transceiver port 104, respectively.

It should be understood that the depicted signal processing unit 108 may include additional functionality not shown and/or the functionality shown may be omitted, and that the scope of the present disclosure is not limited in this regard.

The synchronization unit 106 is respectively connected to the first signal transceiver port 102, the second signal transceiver port 104, and the signal processing unit 108. The synchronization unit 106 respectively receives radio frequency signals from the first signal transceiver port 102 and the second signal transceiver port 104 to demodulate the TDD switching signals therein. After analyzing the TDD switching signal, the synchronization unit 106 modulates the TDD (Time Division Duplex) switching signal and sends the TDD switching signal to a far-end of the DAS system through the connected signal processing unit 108.

It should be understood that the depicted synchronization unit 106 may include additional functionality not shown and/or that shown functionality may be omitted, and that the scope of the present disclosure is not limited in this regard.

In certain embodiment(s), the first signal transceiver port 102 includes a 5G network port, and the second signal transceiver port 104 includes a 4G network port. In certain embodiment(s), the second signal transceiver port 104 further includes at least one of a 2G network port and a 3G network port.

Figure 2:
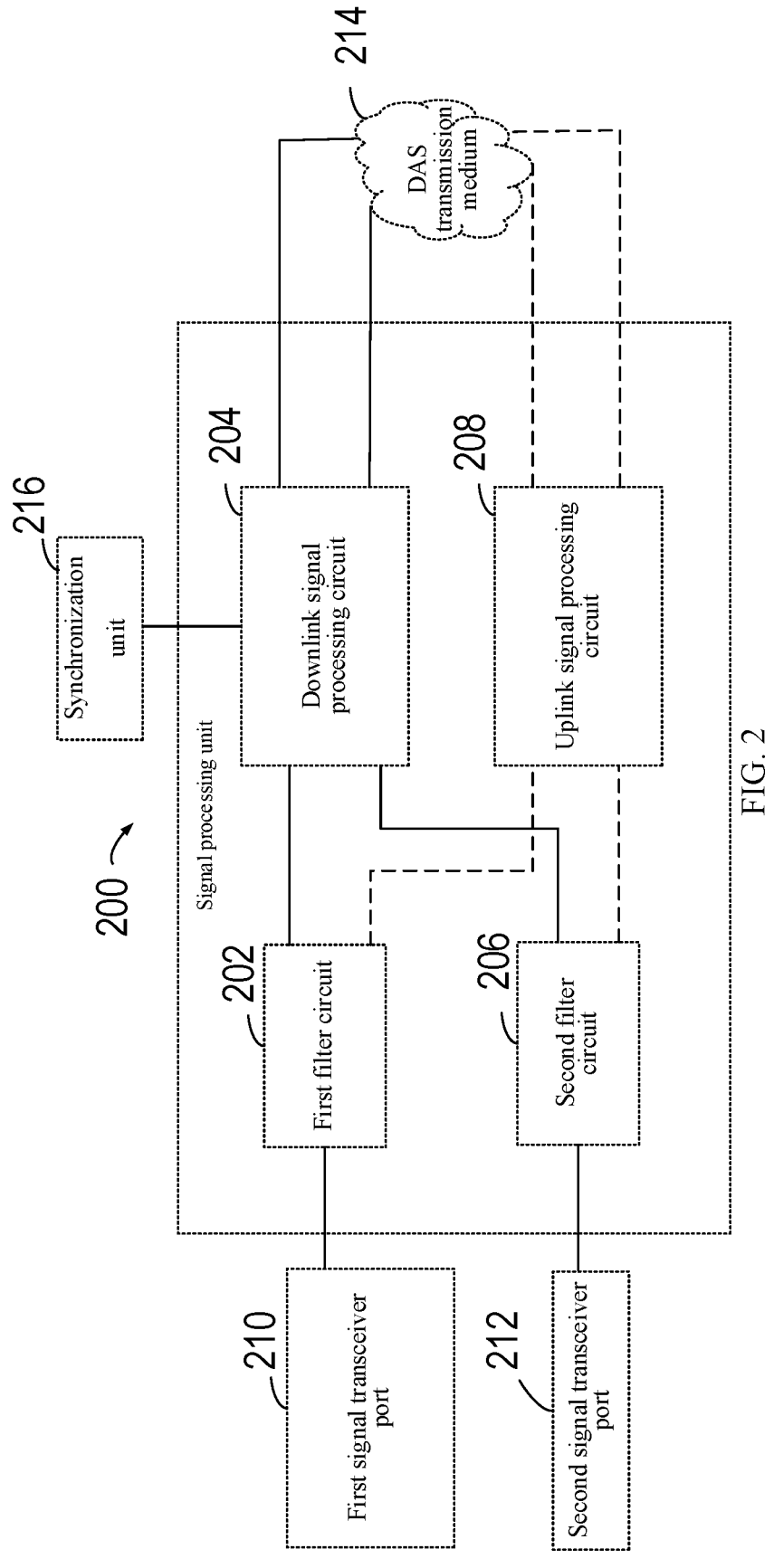
FIG. 2 shows a schematic diagram of a signal processing unit 200 according to certain embodiment(s) of the present disclosure.

FIG. 2 shows a schematic diagram of a signal processing unit 200 according to certain embodiment(s) of the present disclosure. As shown in FIG. 2, in certain embodiment(s), the signal processing unit 200 is connected to a first signal transceiver port 210 and a second signal transceiver port 212, respectively, for combining an uplink radio frequency signal and splitting a downlink radio frequency signal, and for filtering the uplink radio frequency signal and the downlink radio frequency signal. The signal processing unit 200 includes a first filter circuit 202, a second filter circuit 206, an uplink signal processing circuit 208, and a downlink signal processing circuit 204.

It should be understood that the depicted signal processing unit 200 may include additional functionality not shown and/or the functionality shown may be omitted, and that the scope of the present disclosure is not limited in this regard.

In certain embodiment(s), the first filter circuit 202 is a filter, and the second filter circuit is a filter or a duplexer.

Figure 3:
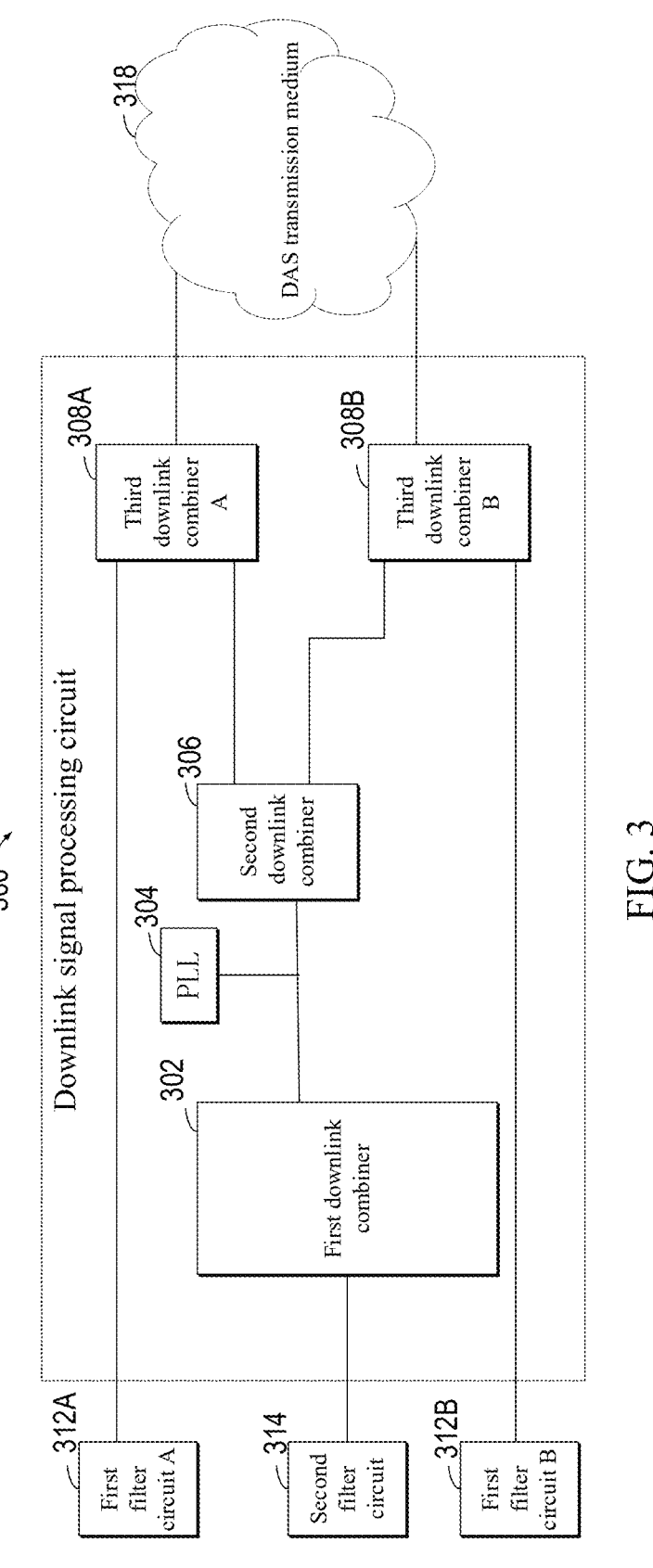
FIG. 3 shows a schematic diagram of a downlink signal processing circuit 300 according to certain embodiment(s) of the present disclosure.

FIG. 3 shows a schematic diagram of a downlink signal processing circuit 300 according to certain embodiment(s) of the present disclosure. As shown in FIG. 3, in certain embodiment(s), the downlink signal processing circuit 300 is respectively connected to a first filter circuit A 312A, a first filter circuit B 312B, a second filter circuit 314, and a DAS transmission medium 318. The downlink signal processing circuit 300 includes a first downlink combiner 302 connected to the second filter circuit 314, a second downlink combiner 306 respectively connected to the first downlink combiner 302 and a PPL (Phase Locked Loop) element 304, a third downlink combiner A 308A respectively connected to the second downlink combiner 306 and the first filter circuit 312 A, and a third downlink combiner B 308B respectively connected to the second downlink combiner 306 and the first filter circuit B 312B. The first downlink combiner 302 is used for combining downlink radio frequency signals filtered by the second filter circuit 314. The second downlink combiner 306 is used for splitting an output of the first downlink combiner 302. The third downlink combiners 308A and 308B combine the downlink radio frequency signal filtered by the first filter circuits 312A and 312B and a split output of the second downlink combiner, and the generated combined radio frequency signal is output to the DAS through the corresponding output port to a transmission media 318 of the DAS system.

It should be understood that the described downlink signal processing circuit 300 may include additional functions not shown and/or may omit the functions shown, and the scope of the present disclosure is not limited in this regard.

Figure 4:
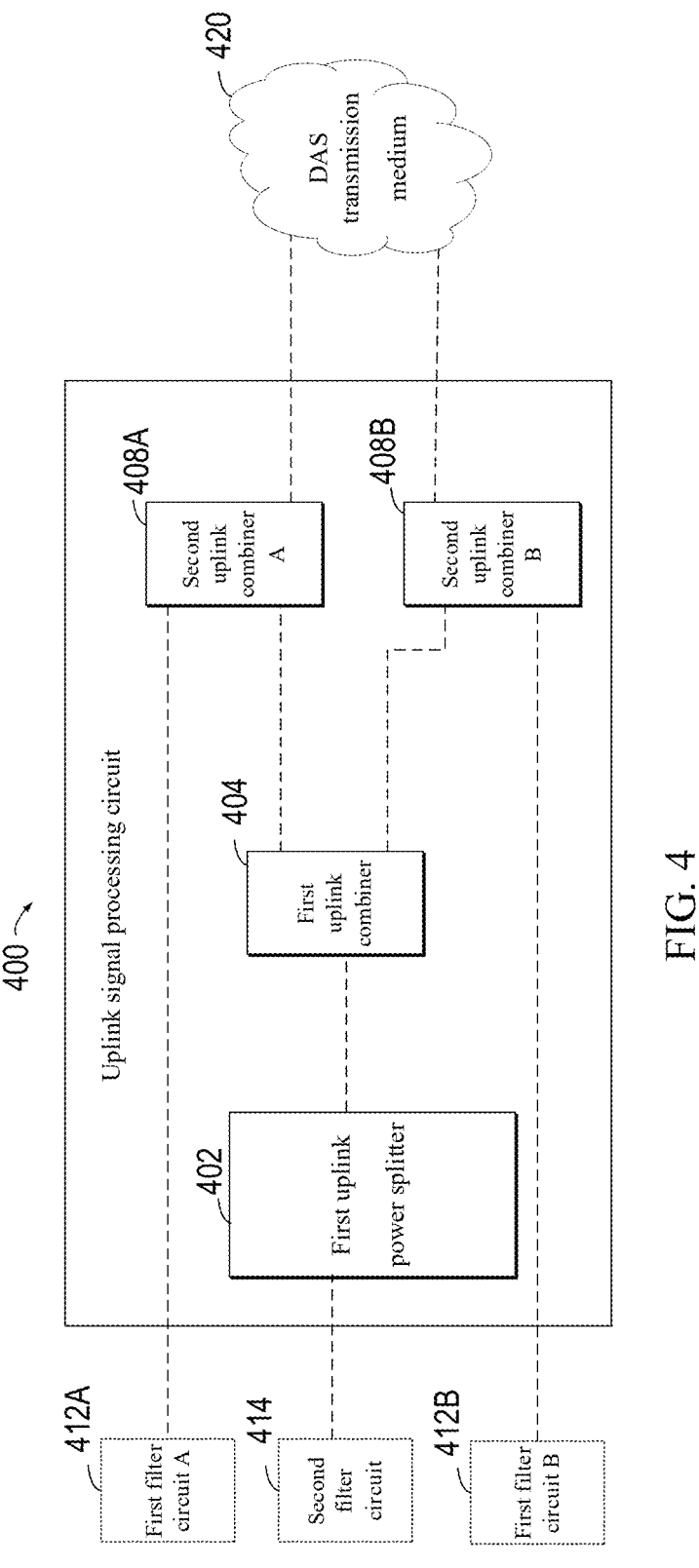
FIG. 4 shows a schematic diagram of an uplink signal processing circuit 400 according to certain embodiment(s) of the present disclosure.

FIG. 4 shows a schematic diagram of an uplink signal processing circuit 400 according to certain embodiment(s) of the present disclosure. As shown in FIG. 4, in certain embodiment(s), the uplink signal processing circuit 400 is respectively connected to a first filter circuit A 412A, a first filter circuit B 412B, a second filter circuit 414, and a DAS transmission medium 420. The uplink signal processing circuit 400 includes a first uplink power splitter 402 connected to the second filter circuit 414, a first uplink combiner 404 connected to the first uplink power splitter 402, and a second uplink combiner 408A and a second uplink combiner B 408B respectively connected to the first uplink combiner 404 and the first filter circuit B 412B. The second uplink combiner 408A and the second uplink combiner B 408B are used to split the uplink radio frequency signal transmitted through a transmission medium 420 in the DAS system, and output the generated first uplink split signal to the first filter circuit B 412B, the first filter circuit A 412A, and the first uplink combiner 404. The first uplink combiner 404 is configured to combine the first uplink split signals of the second uplink combiners 408A and 408B, and to output the generated uplink combined signal to the first uplink power splitter 402. The first uplink power splitter 402 is used for splitting the first uplink combined signal of the first uplink combiner 404, and outputting the generated second uplink split signal to the second filter circuit 414.

It should be understood that the described uplink signal processing circuit 400 may include additional functions not shown and/or the shown functions may be omitted, and the scope of the present disclosure is not limited in this regard.

Figure 5:
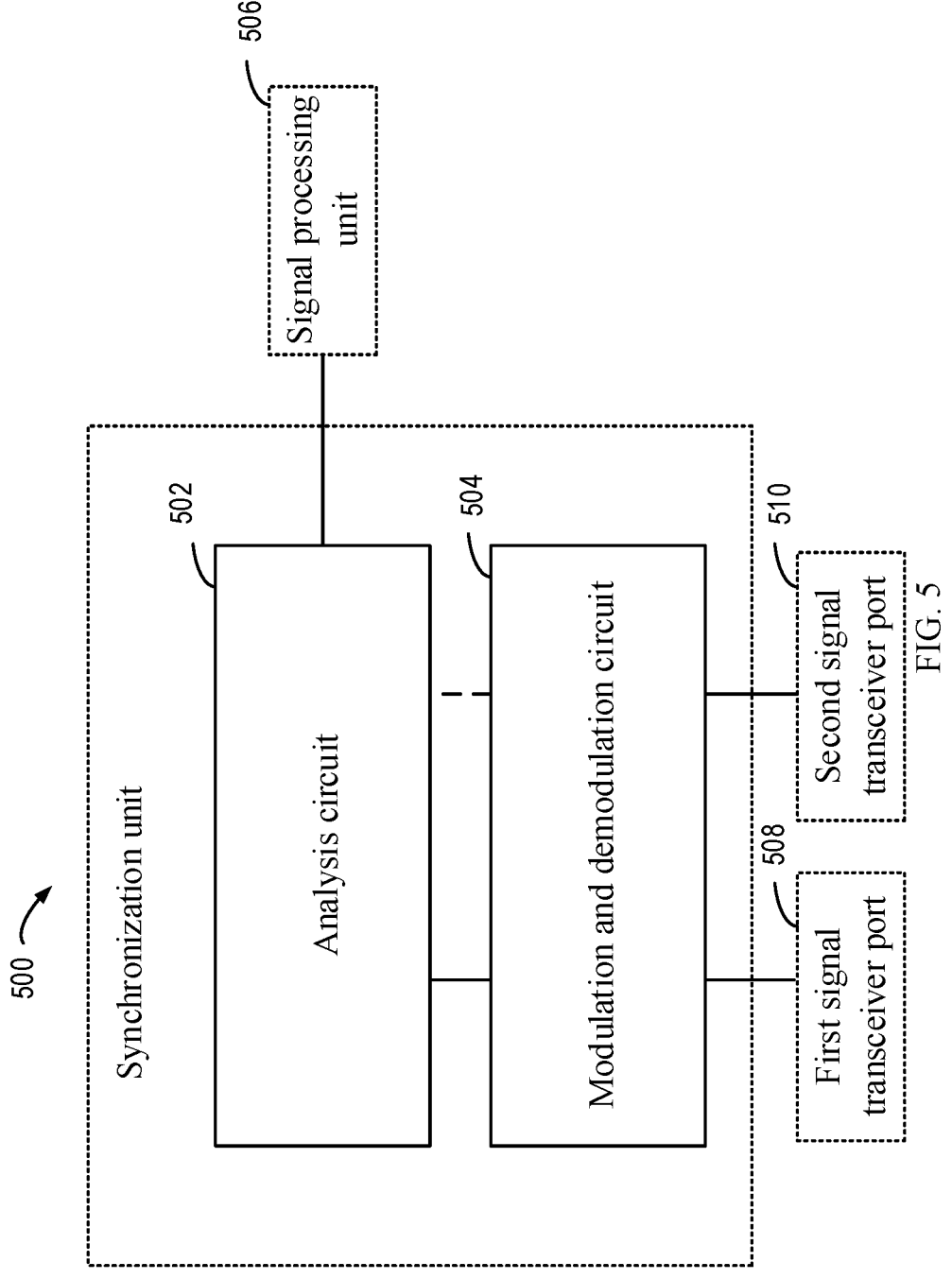
FIG. 5 shows a schematic diagram of a synchronization unit 500 according to certain embodiment(s) of the present disclosure.

FIG. 5 shows a schematic diagram of a synchronization unit 500 according to certain embodiment(s) of the present disclosure. As shown in FIG. 5, in certain embodiment(s), the synchronization unit 500 is respectively connected to a first signal transceiver port 508, a second signal transceiver port 510, and a signal processing unit 506, and is used for modulation, demodulation and analysis of TDD switching signals in downlink radio frequency signals. The synchronization unit includes a modulation and demodulation circuit 504 and an analysis circuit 502. The synchronization unit 500 transmits the modulated TDD switch signal to the far-end of the DAS system, by being connected to the downlink signal processing circuit of the signal processing unit 506.

It should be understood that the depicted synchronization unit 500 may include additional functionality not shown and/or may omit the functionality shown, and that the scope of the present disclosure is not limited in this regard.

Figure 6:
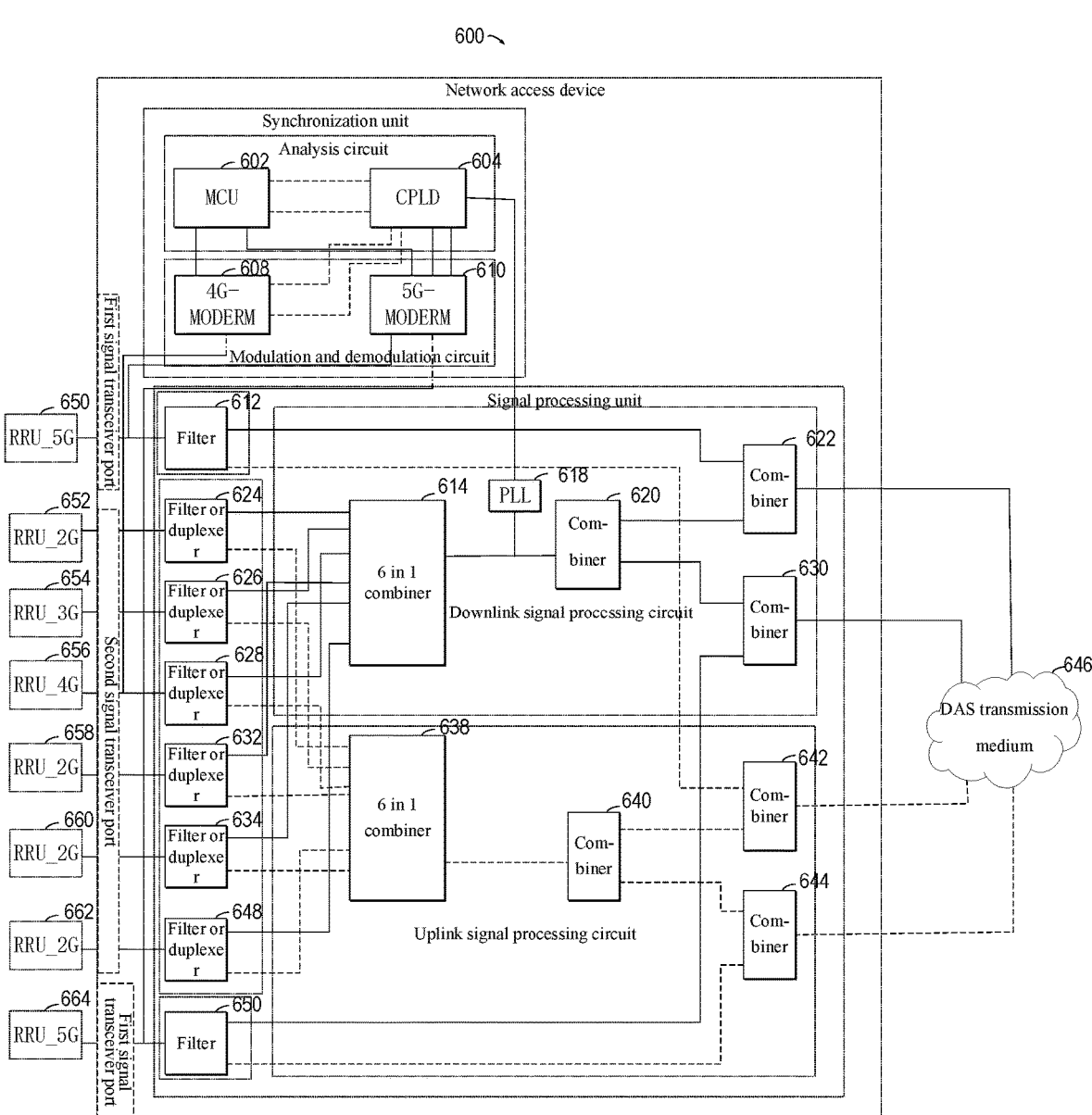
FIG. 6 shows a schematic diagram of a network access device 600 according to certain embodiment(s) of the present disclosure.

FIG. 6 shows a schematic diagram of a network access device 600 according to an embodiment of the present disclosure. As shown in FIG. 6, in certain embodiment(s), the first signal transceiver port includes two radio frequency signal ports of the 5G network, and transmits and receives radio frequency signals in a multiple-input multiple-output manner. The second signal transceiver port includes 2G network, 3G network and 4G network transceiver ports, and transmits and receives radio frequency signals in a single-input-single-output manner.

The 2-way 5G network uplink/downlink radio frequency signal ports of the first signal transceiver port are respectively connected to corresponding filter elements of the first filter circuit, and the 6-way radio frequency signal ports of different networks of the second signal transceiver port are respectively connected to corresponding filter elements of the second filter circuit.

In certain embodiment(s), the first filter circuit and the second filter circuit each include or are composed of package-compatible PA daughter boards. The second filter circuit may include or be composed of duplexer elements.

The first downlink combiner includes or is composed of a first downlink combiner 614, which in certain embodiment (s) is a six-in-one combiner 614, for combining downlink radio frequency signals of the second transceiver port filtered by the second filter circuit. The second downlink combiner includes or is composed of 2-in-1 combiner elements, and is used as a splitter to split the output of the first downlink combiner 614. In certain embodiment(s), the third downlink combiners 622 and 630 each include or are composed of a 2-in-1 combiner element. Each combiner element is respectively connected to a first filter circuit 612, a first filter circuit 650, and a second downlink combiner 620, and combines the downlink radio frequency signal filtered by the first filter circuit 612 and the first filter circuit 650 and a split output of the second downlink combiner 620, and the generated combined radio frequency signal is output, through corresponding output port, to a transmission medium 646 of the DAS system.

The second uplink combiner includes or is composed of two two-in-one combiner elements 642 and 644, and is used for splitting and transmitting the uplink radio frequency signal through a transmission medium 646 in the DAS system, and outputs the generated first uplink split signal to the first filter circuit 612, the first filter circuit 650, and a first uplink combiner 640. The first uplink combiner 640 includes or is composed of a two-in-one combiner element, which is used to combine the first uplink split signals of the second uplink combiners 642 and 644, and to output the generated uplink combiner signal to a first uplink power splitter 638. In certain embodiment(s), the first uplink power splitter 638 includes or is composed of six-in-one power splitter, which is used to split the uplink combined signal of the first uplink combiner 640 and output the generated second uplink split signal to the filter or duplexer of the second filter circuit.

The modulation and demodulation circuit includes a first modem 610 connected to the first signal transceiver port and a second modem 608 connected to the second signal transceiver port, and is used to demodulate the TDD switch signal in the downlink radio frequency signal to generate a pulse signal, and to generate a modulated TDD switching signal. The first modem 610 is used for modulating and demodulating the first radio frequency signal, and the second modem 608 is used for modulating and demodulating the second radio frequency signal. The first signal transceiver port includes a 5G network port, the first modem 610 is used to modulate and demodulate 5G downlink radio frequency signals, the second signal transceiver port includes a 4G network port, and the second modem 608 is used to modulate and demodulate 4G downlink radio frequency signals.

In certain embodiment(s), the pulse signal generated by the modulation and demodulation circuit is a square wave with a period of 10 ms (milliseconds) or 5 ms, and the modulated TDD switching signal is generated by modulating the TDD switching signal to a fixed frequency. The analysis circuit is connected with the modulation and demodulation circuit, and is used for analyzing the pulse signal output by the modulation and demodulation circuit. The analysis circuit includes MCU (Microcontroller Unit) 602 and CPLD (Complex Programmable Logic Device) 604.

The process of implementing multi-channel transmission of downlink radio frequency signals through network access devices will be described below with reference to FIG. 6.

As shown in FIG. 6, different RRU signals are connected to the DAS system through the networking access device. The downlink radio frequency signal of the 5G standard is received through two signal ports of the first signal transceiver port, and sent to the first filter circuit for filtering processing. The filtered downlink radio frequency signal is sent to the third downlink combiners 622 and 630. The downlink radio frequency signal of 2G, 3G and 4G standard is received through corresponding 6 different signal ports of the second signal transceiver port, and sent to the second filter circuit for filtering processing. The processed downlink radio frequency signal is sent to the first downlink combiner 614 for combining. The combined downlink radio frequency signal is sent to the second downlink combiner 620. The second downlink combiner 620 combines the downlink radio frequency signals combined by the first downlink combiner 614, so as to send the combined downlink radio frequency signals to the combiner elements of the third downlink combiners 622 and 630. The number of combiner elements in the third downlink combiner corresponds to the number of ports in the first signal transceiver port, so as to combine the multiple 5G downlink radio frequency signals with the downlink combined radio frequency signals in the 2G, 3G and 4G standard output by the second downlink combiner. The multiple downlink radio frequency signals output by the combiner elements in the third downlink combiners 622 and 630 are transmitted to the far-end of the DAS via multiple different transmission media 646 (for example, optical transmission modules) in the DAS system, and are transmitted by the far-end to a mobile terminal, so as to realize the multi-channel network access of the downlink radio frequency signal.

The following describes the process of receiving uplink radio frequency signals through multiple channels via the network access device with reference to FIG. 6.

As shown in FIG. 6, when the near-end of the DAS system receives the uplink radio frequency signal transmitted from the far-end of the DAS system through the transmission medium 646 via the network access device, the combined uplink radio frequency signal of 2G, 3G, 4G and 5G standards is sent to two combiner elements 642 and 644 in the second uplink combiner. The two combiner elements 642 and 644 in the second uplink combiner split the uplink radio frequency signals to generate four uplink radio frequency signals, and send two of the uplink radio frequency signals to the first filter circuits 612 and 650, and send the other two radio frequency signals to the first uplink combiner 640. After filtering the uplink radio frequency signal, the two filter elements 612 and 650 send the uplink radio frequency signal to two different 5G network ports in the first signal transceiver port. On the other hand, the first uplink combiner 640 combines the two uplink radio frequency signals, and then sends the combined uplink radio frequency signals to the first uplink power splitter 638. The first uplink power splitter 638 splits the uplink radio frequency signal to generate six uplink radio frequency signals, which, after being filtered by different filter elements of corresponding second filter circuit, is sent to corresponding transceiver port in 2G, 3G, and 4G network standard of the second signal transceiver port, so as to realize the multi-channel network access of the uplink radio frequency signals.

The process of implementing modulation and demodulation and transmitting TDD switching signals through network access devices is described below in conjunction with FIG. 6.

As shown in FIG. 6, after the downlink radio frequency signal of the 5G standard is received through the two-way signal port of the first signal transceiver port, a part of the signal is sent to the synchronization unit. The first modem 610 in the synchronization unit demodulates the switch frame header signal in the signal, and sends the demodulated square wave pulse signal with a period of 10 ms or 5 ms to the CPLD 604 for analysis. After the analysis by CPLD 604, the first modem 610 modulates the switch signal to a fixed frequency to obtain the modulated TDD switch signal, and sends the modulated TDD switch signal, via uplink signal processing circuit of the signal processing unit, to multiple different transmission media 646 of the DAS system (for example, an optical transmission module) to the far-end of the DAS, so as to realize processing of the TDD switch signal at the near-end of the DAS system.

Figure 7:
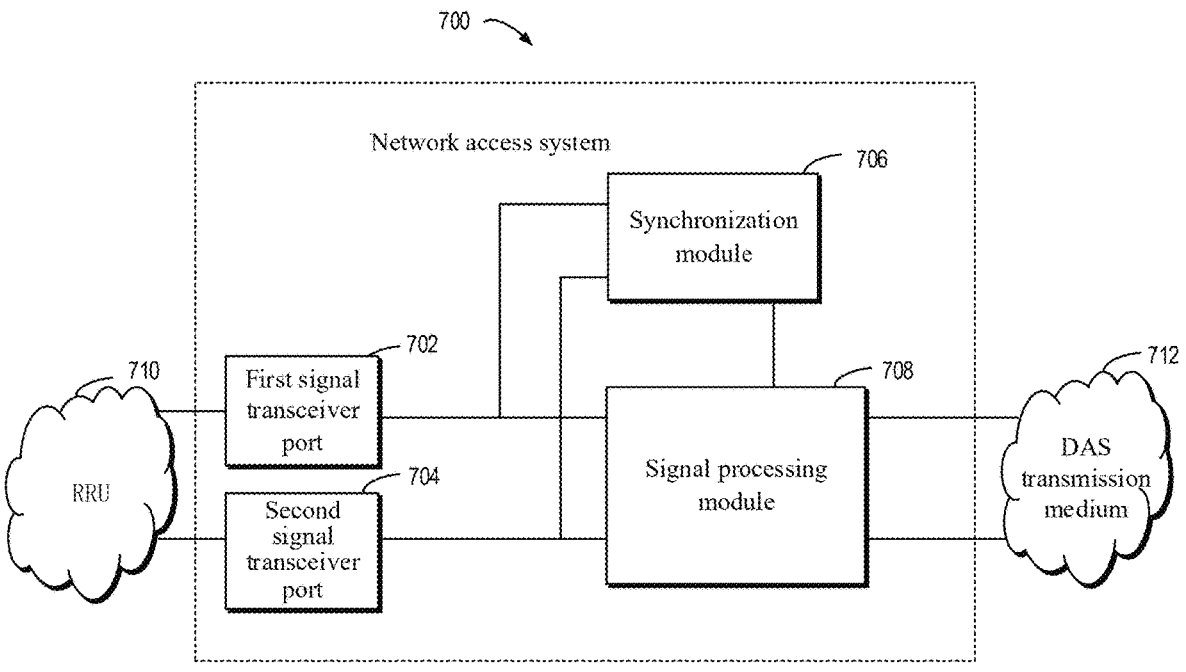
FIG. 7 shows a schematic block diagram of a network access system 700 according to certain embodiment(s) of the present disclosure.

FIG. 7 shows a block diagram of a network access system 700 according to certain embodiment(s) of the present disclosure.

A first signal transceiver port 702 is configured to transmit and receive a first radio frequency signal in a multiple-input-multiple-output manner;

A second signal transceiver port 704 is configured to transmit and receive a second radio frequency signal in a single-input-single-output manner;

A signal processing module 708 is configured to filter and combine and/or split the first radio frequency signal and the second radio frequency signal, and the signal processing module 708 is respectively connected to the first signal transceiver port 702 and the second signal transceiver port 704;

A synchronization module 706 is configured to demodulate, analyze and modulate the TDD switch signal in the first radio frequency signal and the second radio frequency signal, and the synchronization module 706 is respectively connected with the first signal transceiver port 702, the second signal transceiver port 704, and the signal processing module 708.

For other aspects of the network access system 700, reference may be made to certain embodiment(s) of the above-mentioned network access device.

Various embodiment(s) of the present disclosure have been described as shown above, and the foregoing description is exemplary, not exhaustive, and is not limited to the disclosed embodiment(s). Many modifications and alterations will be apparent to those of ordinary skill in the art without have to depart from the scope and spirit of the described embodiment(s). The choice of terminology used herein is intended to help explain the principle of certain embodiment(s), practical implementation or technical improvement in the market, or to enable other ordinary skilled in the technical field to understand certain embodiment(s) disclosed herein.

What is claimed is:

1. A network access device, comprising:
    a first signal transceiver port, configured to transmit and receive a first radio frequency signal in a multiple-input-multiple-output manner;
    a second signal transceiver port, configured to transmit and receive a second radio frequency signal in a single-input-single-output manner;
    a signal processing unit, configured to filter the first radio frequency signal and the second radio frequency signal, and to combine and/or split the first radio frequency signal and the second radio frequency signal, the signal processing unit being respectively connected to the first signal transceiver port and the second signal transceiver port;
    a synchronization unit, configured to demodulate, analyze and modulate the first radio frequency signal and a Time Division Duplex (TDD) switch signal in the second radio frequency signal, the synchronization unit being respectively connected to the first signal transceiver port, the second signal transceiver port, and the signal processing unit.

2. The network access device according to claim 1, wherein the signal processing unit comprises:
    a first filter circuit connected to the first signal transceiver port;
    a second filter circuit connected to the second signal transceiver port;
    an uplink signal processing circuit respectively connected to the first filter circuit and the second filter circuit; and
    a downlink signal processing circuit respectively connected to the first filter circuit and the second filter circuit.

3. The network access device according to claim 2, wherein the downlink signal processing circuit comprises:

a first downlink combiner, connected to the second filter circuit, the first downlink combiner being configured to combine downlink radio frequency signals output by the second filter circuit to generate a downlink combined signal and to output the downlink combined signal to a second downlink combiner;

the second downlink combiner, respectively connected to the first downlink combiner and a Phase Locked Loop (PLL) element, the second downlink combiner being configured to split the downlink combined signal and the TDD switch signal of the synchronization unit input through the PLL element to generate a downlink split signal, and output the downlink split signal to a third downlink combiner; and the third downlink combiner, respectively connected to the second downlink combiner and the first filter circuit, the third downlink combiner being configured to combine the downlink radio frequency signal output by the first filter circuit and the downlink split signal output by the second downlink splitter so as to generate a downlink output signal.

4. The networking access device according to claim 2, wherein the uplink signal processing circuit comprises:

a first uplink power splitter, connected to the second filter circuit, the first uplink power splitter being configured to split the uplink combined signal output by a first uplink combiner to generate a second uplink split signal and to output the second uplink split signal to the second filter circuit;

the first uplink combiner, connected to the first uplink power splitter, the first uplink combiner being configured to combine the first uplink split signal output by a second uplink combiner to generate an uplink combined signal and to output the uplink combined signal to the first uplink power splitter; and the second uplink combiner, respectively connected to the first uplink combiner and the first filter circuit, and the second uplink combiner being configured to split an uplink radio frequency signal of the first radio frequency signal and an uplink radio frequency signal of the second radio frequency signal to generate a first uplink split signal, and to output the first uplink split signal to the first filter circuit and the first uplink combiner.

5. The network access device according to claim 2, wherein the first filter circuit is a filter, and the second filter circuit is a filter or a duplexer.

6. The network access device according to claim 1, wherein the first signal transceiver port comprises a 5G network port, and the second signal transceiver port comprises a 4G network port.

7. The network access device according to claim 6, wherein the second signal transceiver port further comprises at least one of a 2G network port and a 3G network port.

8. The network access device according to claim 1, wherein the synchronization unit comprises:

a modulation and demodulation circuit configured to demodulate the TDD switch signal to output a pulse signal, and to generate a modulated TDD switch signal; and a signal analysis circuit, connected to the modulation and demodulation circuit, configured to analyze the pulse signal output by the modulation and demodulation circuit.

9. The network access device according to claim 8, wherein the modulation and demodulation circuit comprises:

a first modem, connected to the first signal transceiver port, configured to modulate and demodulate the TDD switch signal in the first radio frequency signal;

a second modem, connected to the second signal transceiver port, configured to modulate and demodulate the TDD switch signal in the second radio frequency signal.

10. The network access device according to claim 8, wherein the modulated TDD switch signal is output through the signal processing unit.

11. The network access device according to claim 8, wherein the signal analysis circuit comprises:

a Microcontroller Unit (MCU) circuit, configured to analyze and control the pulse signal; and a Complex Programmable Logic Device (CPLD) circuit, configured to analyze and calculate the pulse signal.

12. A network access system, comprising a network access device, the network access device comprising:

a first signal transceiver port, configured to transmit and receive a first radio frequency signal in a multiple-input-multiple-output manner;

a second signal transceiver port, configured to transmit and receive a second radio frequency signal in a single-input-single-output manner;

a signal processing unit, configured to filter the first radio frequency signal and the second radio frequency signal, and to combine and/or split the first radio frequency signal and the second radio frequency signal, the signal processing unit being respectively connected to the first signal transceiver port and the second signal transceiver port;

a synchronization unit, configured to demodulate, analyze and modulate the first radio frequency signal and a Time Division Duplex (TDD) switch signal in the second radio frequency signal, the synchronization unit being respectively connected to the first signal transceiver port, the second signal transceiver port, and the signal processing unit.

* * * * *